United States Patent
Golden et al.

[19]

[11] Patent Number: 5,887,037
[45] Date of Patent: Mar. 23, 1999

[54] INTRODUCING PROCESSING DELAY AS A MULTIPLE OF THE TIME SLOT DURATION

[75] Inventors: Glenn David Golden, Tinton Falls; Carol Catalano Martin, Fairhaven; Jack Harriman Winters, Middletown, all of N.J.

[73] Assignee: Lucent Technologies Inc., Murray Hill, N.J.

[21] Appl. No.: 606,777

[22] Filed: Feb. 27, 1996

[51] Int. Cl.$^6$ ..................................................... H04B 7/06
[52] U.S. Cl. ........................... 375/347; 375/349; 455/562; 455/65; 455/303
[58] Field of Search ..................... 375/347, 349, 375/267, 232, 316, 365, 371; 455/272, 303, 562, 506, 65, 296, 561, 273, 276.1, 501, 63; 370/334, 337, 347, 915, 512, 517, 519; 371/1

[56] References Cited

U.S. PATENT DOCUMENTS

| | | | |
|---|---|---|---|
| 4,397,036 | 8/1983 | Hirade et al. | 375/347 |
| 5,481,570 | 1/1996 | Winters | 375/347 |
| 5,530,725 | 6/1996 | Koch | 375/347 |
| 5,592,490 | 1/1997 | Barratt et al. | 370/310 |

OTHER PUBLICATIONS

Winters, J., Signal Acquisitions and Tracking with Adaptive Arrays in the Digital Mobile Radio System IS–54 with Flat Fading; published in IEEE Transactions on Vehicular Technology, vol. 42, No. 4, Nov., 1993, pp. 377–384.

Winters, J., et al The Impact of Antenna Diversity on the Capacity of Wireless Communications Systems, published in IEEE Transactions on Communications, vol. 42, No. 2/3/4, Feb., Mar., Apr., 1994 pp. 1740–1751.

*Primary Examiner*—Stephen Chin
*Assistant Examiner*—Betsy L. Deppe
*Attorney, Agent, or Firm*—Barry H. Freedman

[57] ABSTRACT

An apparatus for performance improvement of a burst mode digital wireless receiver has a processing circuit for processing a plurality of received signals and providing a processed signal and a delay circuit for introducing a predetermined delay to the processed signal. The delay circuit is coupled to the processing circuit. The predetermined delay is such that the processed signal is delayed to correspond with a later data burst. The processing circuit weights and combines the received signals, where the processing circuit reduces a mean squared error of an output signal. The processing circuit weights and combines the received signals using a predetermined symbol pattern within a sync sequence within a time slot.

23 Claims, 6 Drawing Sheets

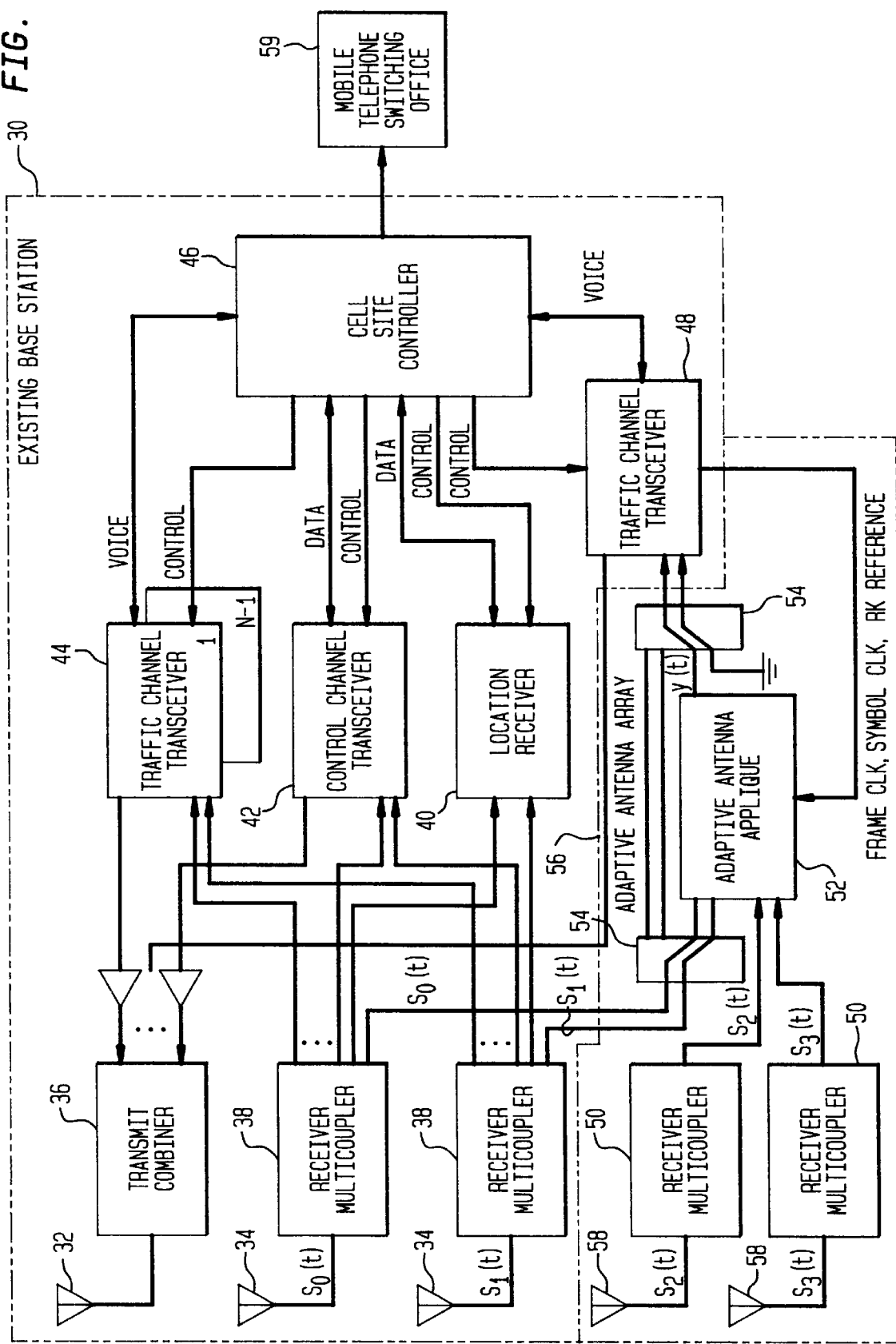

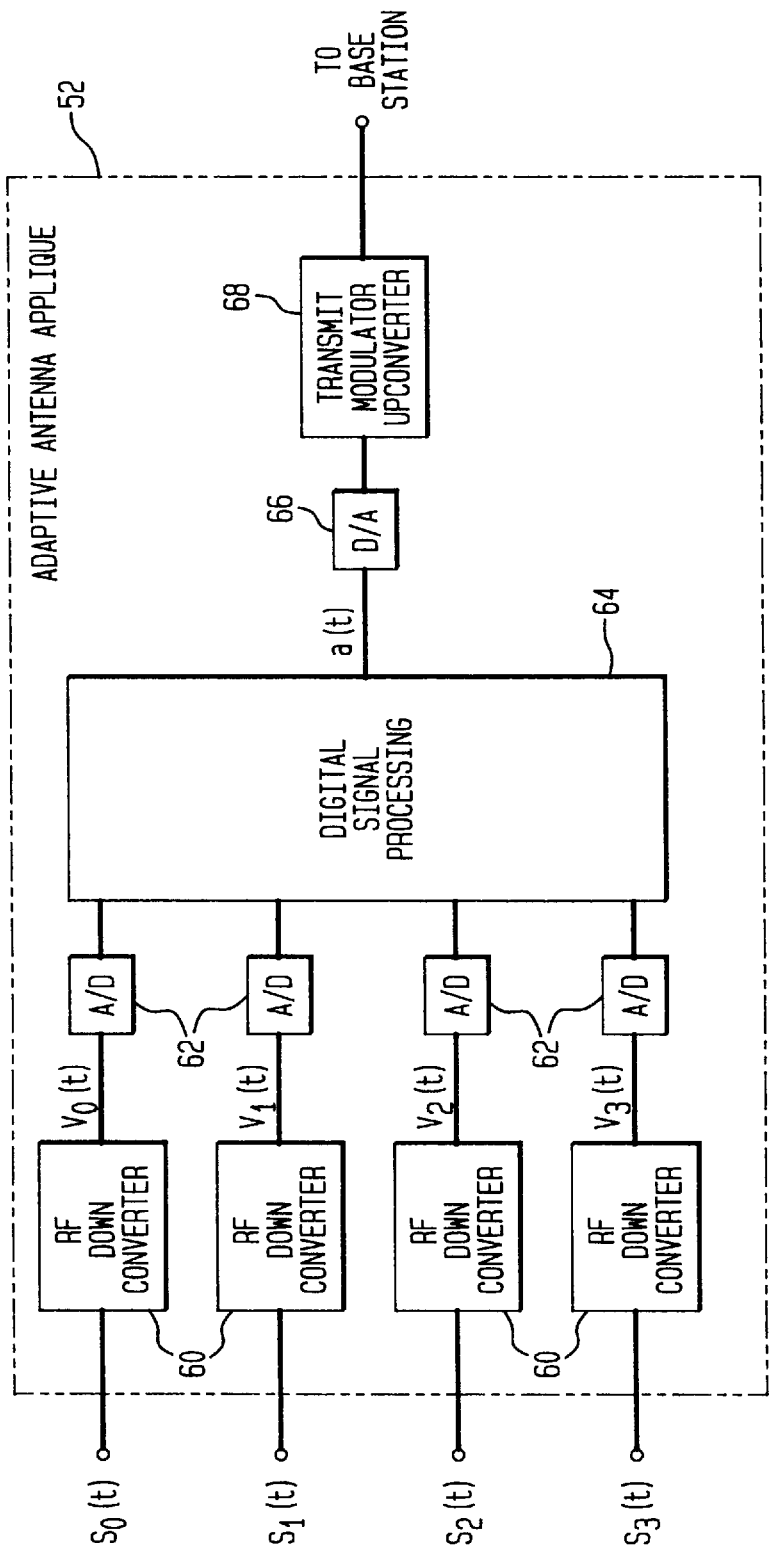

INTRODUCING PROCESSING DELAY AS A MULTIPLE OF THE TIME SLOT DURATION

FIELD OF THE INVENTION

The present invention relates to the field of wireless communication and more particularly to burst mode digital wireless communication systems.

BACKGROUND OF THE INVENTION

In wireless communication systems, the use of antenna arrays at the base station has been shown to increase both range, through increased gain, and capacity, through interference suppression. With adaptive antenna arrays, the signals received by multiple antenna elements are weighted and combined to improve system performance, e.g., by maximizing the desired receive signal power and/or suppressing interference. The performance of an adaptive antenna array increases dramatically with the number of antennas. Referring to an article entitled, "The Impact of Antenna Diversity on the Capacity of Wireless Communication Systems," by J. H. Winters, R. D. Gitlin and J.Salz, in IEEE Trans. on Communications, April 1994, it is shown that using an M element antenna array with optimum combining of the received signals can eliminate $N \leq M-1$ interferers and achieve an M-N fold diversity gain against multipath fading, resulting in increased range.

Most base stations today, however, utilize only two receive antennas with suboptimum processing, e.g., selection diversity where the antenna having the larger signal power is selected for reception and processing. It is desirable to be able to modify existing base stations to accommodate larger arrays of antennas and/or improved received signal combining techniques. However, modifying existing equipment is difficult, time consuming, and costly, in particular since equipment currently in the field is from a variety of vendors.

One alternative is to utilize an applique, which is an outboard signal processing box, interposed between the current base antennas and the input to the base station, which adaptively weights and combines the received signals fed to the base station, optionally utilizing additional antennas. FIG. 1 shows a base station utilizing an applique. A key to the viability of utilizing the applique approach is that it should require little, if any, modification of the base station equipment. This constraint implies that the processing performed by the applique must be transparent to the existing equipment. Ideally, the signal emerging from the applique should appear to the existing base station as a high-quality received signal from a single antenna.

A difficulty in obtaining transparency to the existing equipment is the delay introduced by the signal processing performed in the applique: data acquisition, weight calculation, and received signal combining all introduce significant delay. Although typical cellular base station receivers are capable of accommodating some delay due to signal propagation, such delays are typically limited to the order of tens of microseconds, whereas the delay typically required to determine the weights for optimum array combining is many times that. Therefore, because of the applique delay, the signal seen by the existing base station receiver would appear to have had a propagation delay far in excess of the base station's ability to compensate, and the system would not operate.

A previously proposed solution is to use RF analog weighting and combining of the received signals, rather than digital signal processing of the received signals. However, although RF analog weighting introduces negligible processing delay into the signal path through the applique, the processing time required to calculate the weights is not negligible. The delay to calculate the weights is undesirable because a degraded signal will be output during the time prior to computation of the weights and the array performance will be poor when the fading rate is faster than a few Hz, which is the case at typical vehicle speeds in mobile communications.

SUMMARY OF THE INVENTION

In accordance with the present invention, there is provided an apparatus for performance improvement of a burst mode digital wireless receiver. The apparatus comprises a processing circuit for processing a plurality of received signals and providing a processed signal and a delay circuit for introducing a predetermined delay to the processed signal. The delay circuit is coupled to the processing circuit. The predetermined delay is such that the processed signal is delayed to correspond with a later data burst.

In a further enhancement of the present invention output signals from a plurality of antennas provide the plurality of received signals to the processing circuit.

In yet a further enhancement of the present invention the processing circuit weights and combines the received signals, where the processing circuit reduces a mean squared error of an output signal.

In yet a further enhancement of the present invention the processed signal arrives at the receiver coincident with a time interval for a next data burst.

In yet a further enhancement of the present invention the processing circuit weights and combines the received signals using a predetermined symbol pattern within a sync sequence within a time slot.

A method in accordance with the present invention for performance improvement of a burst mode digital wireless receiver is also described.

BRIEF DESCRIPTION OF THE DRAWINGS

A more complete understanding of the present invention may be obtained from consideration of the following description in conjunction with the drawings in which:

FIG. 2 is a block diagram of a current base station with applique;

FIG. 3 shows a detailed block diagram of the applique;

DETAILED DESCRIPTION OF VARIOUS ILLUSTRATIVE EMBODIMENTS

Although the present invention is particularly well suited for use in TDMA mobile radio systems and shall be described with respect to this application, the methods and apparatus disclosed here can be applied to other burst mode wireless communication systems.

In TDMA mobile radio systems, such as IS-136, in the uplink from mobile station to base station, data is transmitted periodically in time slots or bursts of a known and fixed duration. Each data burst is processed, essentially independently of other data bursts, by the base station receiver. Thus, it is possible to design the applique so that it introduces artificial delay in excess of its true signal processing delay, so that the total delay through the applique is nominally a multiple of the time slot duration. With this arrangement, the delayed data burst arrives nominally aligned with a later time slot, rather than simply very late for its own time slot.

Since all uplink data bursts are processed by the applique in this way, all uplink bursts are time shifted into later time slots, and thus the net delay of all uplink data is increased by the applique delay. Uplink data bursts typically comprise both voice traffic and various administrative information utilized by the cellular system. Thus, additional considerations with this approach are that the additional voice delay be tolerable to the user, and that the additional delays in the administrative data be tolerable to the cellular system as a whole. Illustratively, for the IS-136 traffic channel, operating with full-rate voice coders, the time from the beginning of the time slot of one user to the beginning of that user's next time slot is 20 milliseconds (ms). This delay is adequate for the necessary signal processing, but is unobtrusive to system users. The IS-136 specifications for administrative data transferred via the traffic channel allow for up to 100 ms response times, so that although the 20 ms of applique delay reduces the delay available, it does not exceed the specification. Thus, this technique is viable for the traffic channel in IS-136, and for other burst-mode wireless communication systems as well. In a Groupe Speciale Mobile (GSM) based system, also known as Global System for Mobile Communications, which is a standard digital cellular phone service in Europe and Japan, the delay would correspond to a multiple of 4.615 ms. In a Digital European Cordless Telecommunications (DECT) based system, which is a pan-European digital cordless telephony interface specification, the delay would correspond to a multiple of 10 ms.

Figure 1:
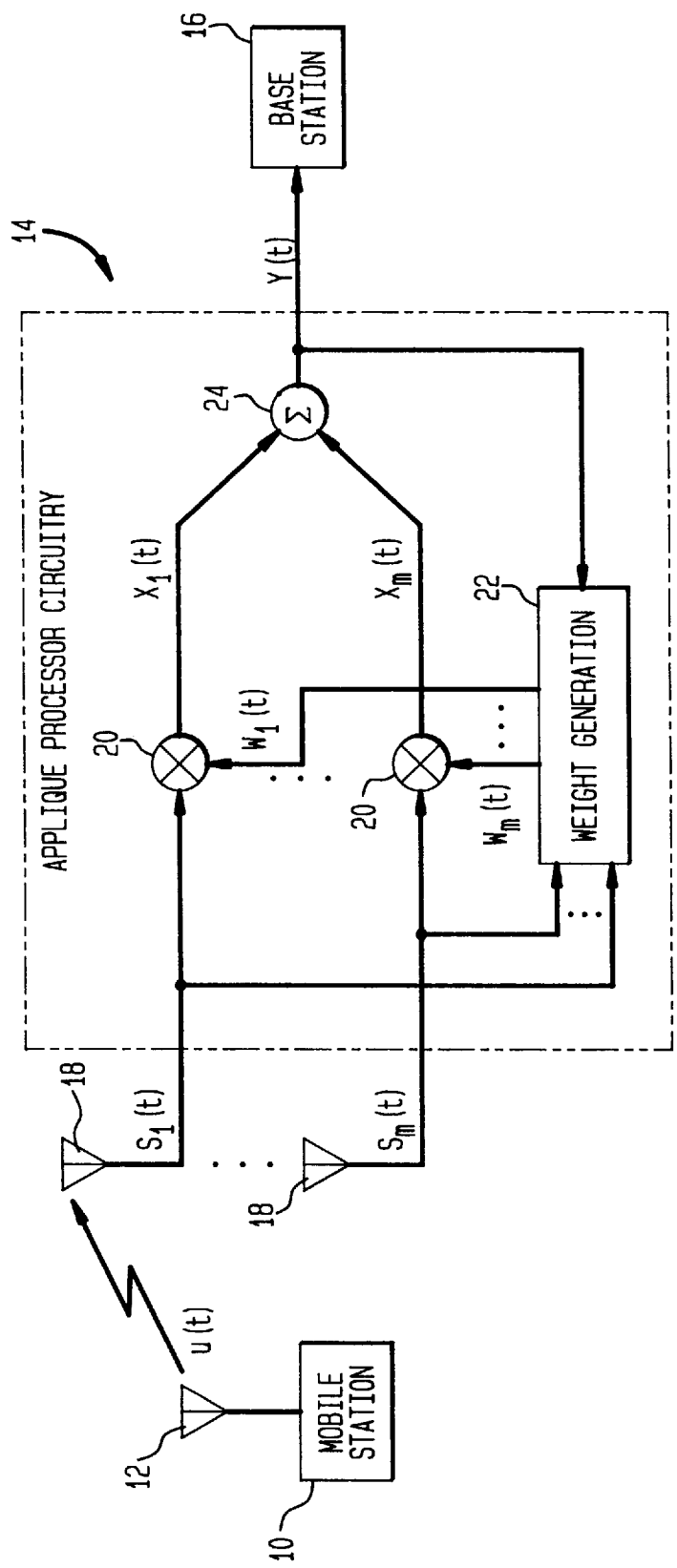
FIG. 1 is a block diagram of an adaptive array using multiple antennas.

Referring to FIG. 1 there is shown a block diagram of a type of signal processing used in a base station applique. A signal $u(t)$ transmitted by a mobile station 10 through a mobile antenna 12 is received by a base station 16 at M antennas 18, with received signals $s_1(t)$ to $s_M(t)$, respectively. The received signals are weighted using multipliers 20 having weights $W_1(t)$ to $W_M(t)$, respectively, to generate corresponding weighted signals $x_1(t)$ to $x_M(t)$. The weighted signals $x_1(t)$ to $x_M(t)$ are then combined using summer 24 to generate an output signal $y(t)$ which is then provided to the base station equipment. Weights $W_1(t)$ to $W_M(t)$ are generated by weight generation circuitry 22 using the received signals $s_1(t)$ to $s_M(t)$ and output signal $y(t)$. At the applique processor circuitry 14, received signals $s_1(t)$ to $s_M(t)$ are weighted and combined to improve signal quality at the output. In one embodiment, the weights are adjusted to minimize the meansquared-error in the output signal.

Referring to FIG. 2 there is shown an existing base station with an adaptive antenna applique. An existing base station 30 consists of one transmit antenna 32 and two receive antennas 34. Signals received by the receive antennas 34 are coupled to a corresponding receiver multicoupler 38, which splits received signals $s_0(t)$ and $s_1(t)$ to a location receiver 40, control channel transceiver 42, N–1 traffic channel transceivers 44, and traffic channel transceiver 48, one transceiver per traffic channel. For each traffic channel, traffic channel transceiver 44 uses received signals $s_0(t)$ and $s_1(t)$ from receive antennas 34 to generate an output voice signal. The voice signals out of the traffic channel transceiver 44 are fed to cell site controller 46 and then passed to mobile telephone switching office MTSO 59.

To add processing such as that shown in FIG. 1, an antenna applique can be added to the base station, with an exemplary embodiment as shown in FIG. 2, illustratively for improving the performance of traffic channel transceiver 48. The added circuitry 56 has two additional receive antennas 58. Signals received by the additional receive antennas 58 are coupled to corresponding receiver multicouplers 50 as in current base station 30. Signals from the receive antennas $s_0(t)$ to $s_3(t)$ are then processed by adaptive antenna applique 52, which generates output signal $y(t)$ that is fed to traffic channel transceiver 48. In FIG. 2, switches 54 permit an input signal of the traffic channel transceiver 48 to be switched between the existing base station 30 and the adaptive antenna applique 52. In this embodiment the addition of the adaptive applique 52 requires no modification of the existing base station 30.

Referring to FIG. 3 there is shown further detail of the adaptive antenna applique 52 of FIG. 2. Received signals $s_0(t)$ to $s_3(t)$ from multicouplers 38 and 50 in FIG. 2 are converted from RF to baseband, or to IF, by RF downconverters 60. Output signals $v_0(t)$ to $v_3(t)$ from downconverters 60 are then converted to digital samples by A/D converters 62, and the digital samples are processed by digital signal processing circuitry 64. The digital signal processing circuitry 64 generates an output signal $a(t)$ which is converted to an analog signal by D/A converter 66 and upconverted to the received carrier frequency by Transmit Modulator/ Upconverter circuitry 68, and the output signal is then coupled to base station traffic channel transceiver 48 in FIG. 2. The applique processes received signals $s_0(t)$ to $s_3(t)$ so as to generate an output signal which appears to the base station 30 in FIG. 2 to have come from a standard antenna, i.e., the applique processing is transparent to the base station 30.

A key issue for transparency is the delay introduced. The adaptive antenna applique 52 shown in FIG. 3 can require a significant amount of processing time in comparison to the propagation delay typically encountered in mobile radio systems. A large portion of that delay is in the calculation of adaptive weights for optimum combining.

Figure 4A:
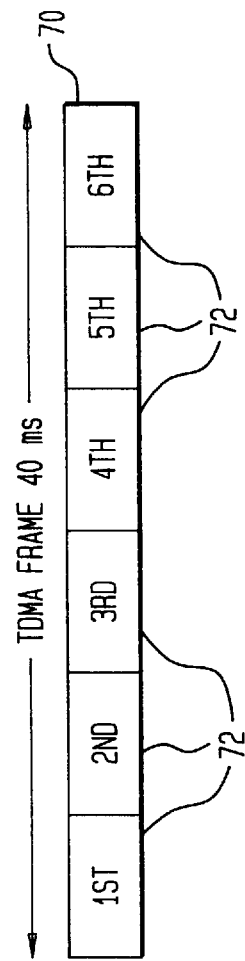
FIG. 4A and 4B show the frame and time slot architecture of the uplink digital traffic channel used in IS-136.
Figure 4B:
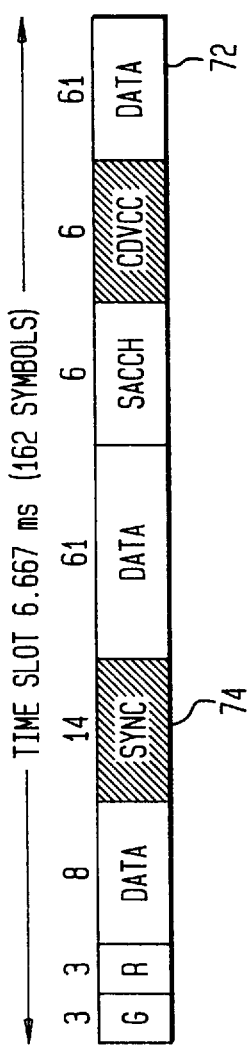

The delay may be better understood by considering illustratively the North American Digital Mobile Radio Standard IS-136. Referring to FIG. 4A there is shown the TDMA frame 70 and time slots 72. Referring to FIG. 4B there is shown in detail a time slot structure 72 of IS-136 uplink (mobile station to base station) digital traffic channel. This is a time-division multiple access (TDMA) frame structure, wherein data transmitted from each mobile station (cellular phone) user is transmitted periodically in time slots 72 or "bursts". There are 6 time slots 72 defined per frame 70. The duration of frame 70 is 40 ms, and each of time slots 72 is one-sixth of the frame duration, approximately 6.7 ms.

When full rate voice coders are used, three users are assigned per channel, with each user transmitting in two of the six time slots, i.e., in time frame 70 the first and fourth time slots 72 for the first user, the second and fifth time slots 72 for the second user, and the third and sixth time slots 72 for the third user. Each time slot 72 comprises 162 symbols, including synchronization (SYNC) sequence 74. The SYNC 74 comprising symbols 15 through 28. This synchronization sequence is fixed and known a priori at the receiver. In order to compute the applique's adaptive weights for the purpose of interference cancellation, e.g. as described in "Signal Acquisition and Tracking with Adaptive Arrays in the Digital Mobile Radio System IS-54 with Flat Fading," by Jack Winters, IEEE Trans. on Vehicular Technology, November 1993, it is advantageous to have prior knowledge of some symbols within each time slot, and SYNC 74 sequence, although not intended originally for this purpose, nevertheless provides this capability. Thus, before the applique can compute the adaptive weights, it must acquire at least the first 28 symbols of the burst. This results a delay of at least 28 symbols (approximately 1152 μsec) for acquisition alone, even if no subsequent processing delays were incurred in the applique; and in fact the subsequent processing delays for actually computing the adaptive weights and deriving the applique output signal would typically exceed this delay significantly. Although IS-136 base station receivers are designed to accommodate delays due to signal propagation, such delays are on the order of a few symbols. Thus the delays required for applique adaptive weight processing inherently exceed the ability of existing IS-136 receivers to operate within the delay allocated for propagation effects.

Figure 5:
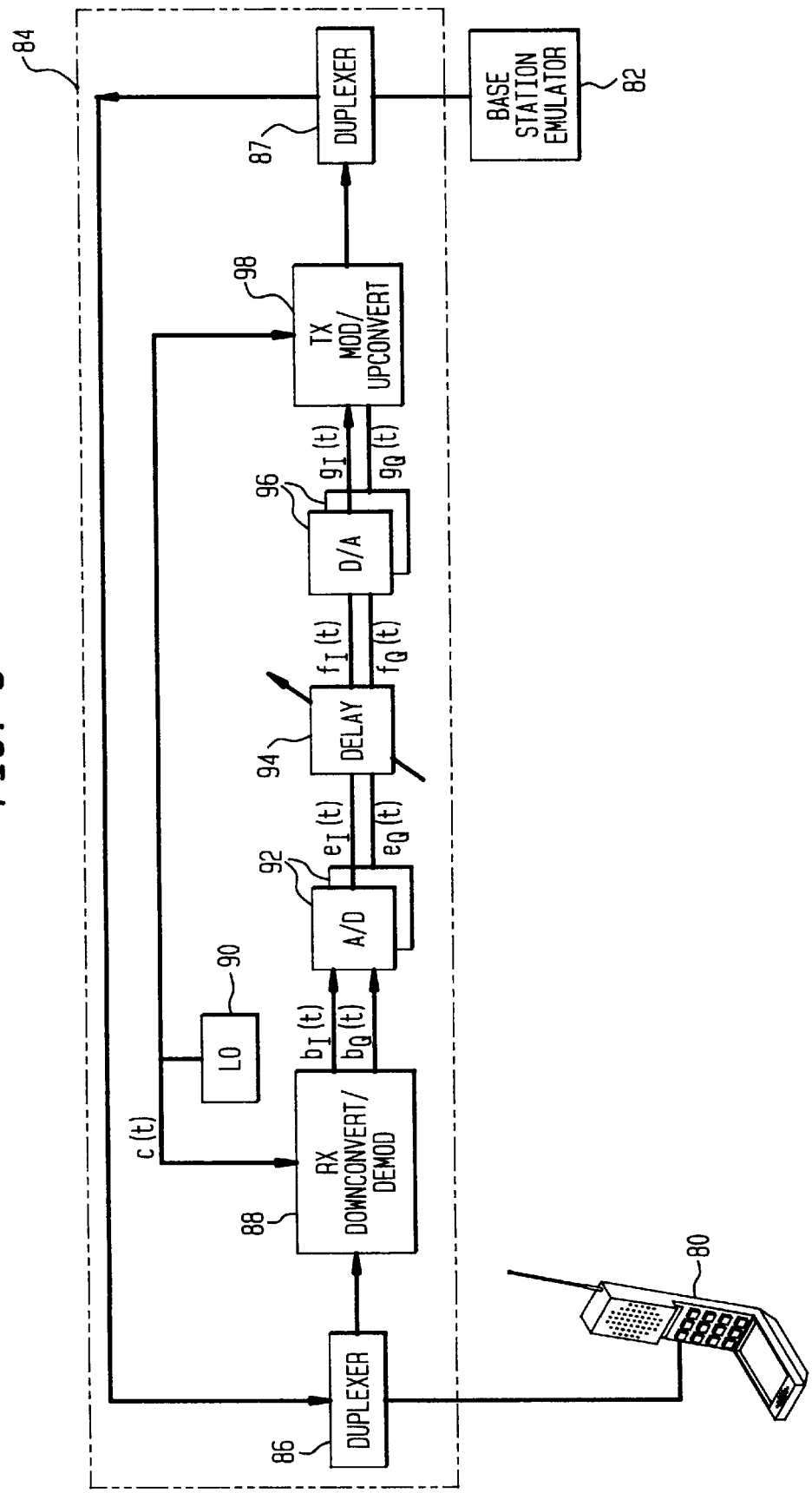
FIG. 5 is a block diagram of an experiment used to test the effects of applique delay, and, FIG. 6 is shown a flow chart of the present invention for performance improvement of a burst mode digital wireless receiver.

Referring to FIG. 5 there is shown a block diagram of the equipment used to test the effect of delay on an IS-54 base station. It should be noted that IS-54 utilizes a traffic channel format identical to IS-136. An IS-54 cellular phone 80 communicates with IS-54 base station emulator 82 through circuitry 84 which introduces delay in the mobile-to-base path. Duplexers 86 and 87 separate the transmit and receive signals, with the signal transmitted from the base connected directly to cellular phone 80 through the duplexers 86 and 87. The signal transmitted from cellular phone 80 goes through duplexer 86 into RX downconverter/demodulator 88 where it is converted to baseband signals $b_I(t)$ and $b_Q(t)$, the inphase and quadrature components respectively, using carrier signal c(t) from local oscillator 90. Baseband signals $b_I(t)$ and $b_Q(t)$ are then converted to digital signals $e_I(t)$ and $e_Q(t)$ using A/D converters 92, and digital signals $e_I(t)$ and $e_Q(t)$ are processed by a digital signal processor contained in a delay circuitry 94 to introduce an adjustable delay. Delayed digital output signals $f_I(t)$ and $f_Q(t)$ are then converted back to analog baseband signals $g_I(t)$ and $g_Q(t)$ by D/A converters 96, and upconverted to the carrier frequency by TX modulator/upconverter 98, using carrier signal c(t) from local oscillator 90. Delayed analog signal h(t) is then fed the base station emulator 82 through duplexer 87.

When a cellular phone call is initially set up with no delay in the uplink path, it was observed that if additional delay of more than a few symbols, but much less than 20 ms, was introduced, then the call is dropped. However, if the introduced delay was very close to 20 ms, i.e., if the signal is delayed so as to align with the next time slot for that user, then the call is not dropped. It was observed that calls would remain up with delays of multiples of 20 ms, up to 200 ms. With delays in this range, base station emulator 82 was still able to perform the administrative functions of mobile transmit power adjustment and mobile time alignment. However, it was not able to successfully complete inter-slot handoffs unless the delay was 3 or fewer times the 20 ms intra-user burst delay. Thus an applique approach is feasible if the delay is a small integer multiple of the intra-user burst delay.

Figure 6:
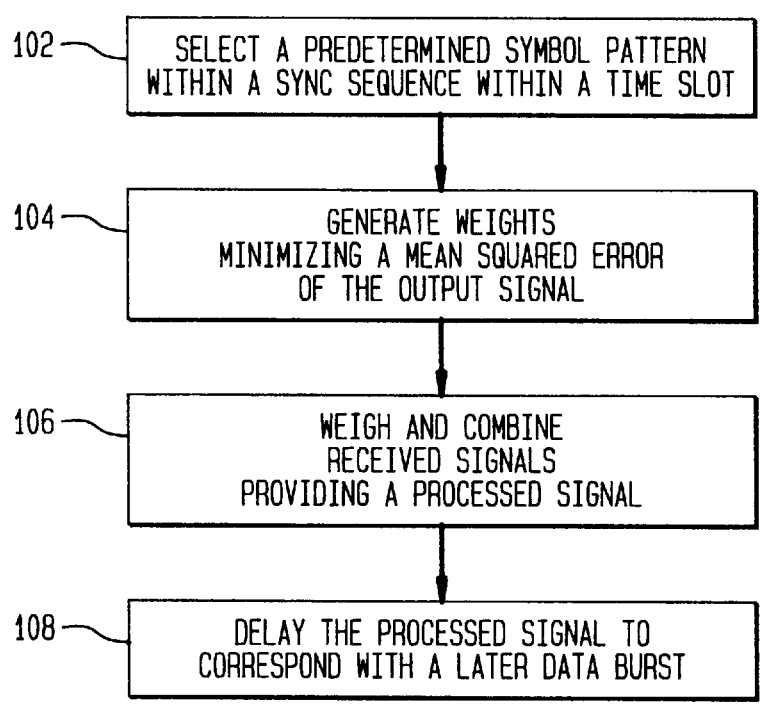

Again referring to FIG. 3 there is shown a plurality of received signals $s_0(t) \ldots s_3(t)$ which are converted and digitized for processing by the digital signal processor (DSP) 64. Referring to FIG. 6 in conjunction with FIG. 3, it can be seen that the processing comprises selecting a predetermined symbol pattern, within a sync sequence 74 (shown in FIG. 4B), within a time slot 72 (shown in FIG. 4B) in step 102. Generating weights, wherein a mean squared error of the output signal is minimized in step 104. Weighing and combining the received signals in step 106 using the generated weights from step 104 to provide a processed signal. Delaying the processed signal in step 108 to correspond with a later data burst.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed is:

1. An apparatus for performance improvement of a burst mode digital wireless receiver comprising:

a processing circuit for processing a plurality of received signals and providing a processed signal; and a delay circuit for introducing a predetermined delay to said processed signal, said delay circuit coupled to said processing circuit;

wherein said predetermined delay is such that said processed signal is delayed to correspond with a later data burst.

2. The apparatus as recited in claim 1 further comprising a plurality of antennas adapted to provide said plurality of received signals to said processing circuit.

3. The apparatus as recited in claim 1 wherein said processing circuit weights and combines said received signals.

4. The apparatus as recited in claim 1 wherein said processing circuit reduces a mean squared error of an output signal.

5. The apparatus as recited in claim 4 wherein said processing circuit minimizes said mean squared error of said output signal.

6. The apparatus as recited in claim 1 wherein said plurality of received signals comprise TDMA mobile radio signals.

7. The apparatus as recited in claim 1 wherein said processed signal is delayed a multiple of 20 milliseconds to correspond with said later data burst.

8. The apparatus as recited in claim 6 wherein said TDMA mobile radio signals comprise IS-54 mobile radio signals.

9. The apparatus as recited in claim 6 wherein said TDMA mobile radio signals comprise IS-136 based mobile radio signals.

10. The apparatus as recited in claim 1 wherein said processed signal is delayed a multiple of 4.615 milliseconds to correspond with said later data burst.

11. The apparatus as recited in claim 6 wherein said TDMA mobile radio signals comprise GSM mobile radio signals.

12. The apparatus as recited in claim 6 wherein said TDMA mobile radio signals comprise DECT mobile radio signals.

13. The apparatus as recited in claim 1 wherein said processed signal is delayed a multiple of 10 milliseconds to correspond with said later data burst.

14. The apparatus as recited in claim 1 wherein said processing circuit comprises a digital signal processor.

15. The apparatus as recited in claim 3 wherein said processing circuit weights and combines said received signals using a predetermined symbol pattern within a time slot.

16. The apparatus as recited in claim 3 wherein said processing circuit weights and combines said received signals using a predetermined symbol pattern within a sync sequence within a time slot.

17. A method for performance improvement of a burst mode digital wireless receiver comprising the steps of:

processing a plurality of received signals to provide a processed signal;

delaying said processed signal to correspond with a later data burst.

18. The method as recited in claim 17 wherein the step of processing a plurality of received signals comprises weighting and combining of said received signals.

19. The method as recited in claim 17 wherein the step of processing a plurality of received signals further comprises reducing a mean squared error of an output signal.

20. The method as recited in claim 19 wherein the step of processing a plurality of received signals further comprises minimizing said mean squared error of said output signal.

21. The method as recited in claim 19 wherein the step of processing a plurality of received signals further comprises using a predetermined symbol pattern within a time slot.

22. The method as recited in claim 19 wherein the step of processing a plurality of received signals further comprises using a predetermined symbol pattern within a sync sequence within a time slot.

23. An apparatus for performance improvement of a burst mode digital wireless receiver comprising:

a digital processing circuit having means for processing a plurality of received signals and providing a processed signal and having means for introducing a predetermined delay to said processed signal, wherein said predetermined delay is such that said processed signal is delayed to correspond with a later data burst.

* * * * *